Oct. 25, 1932.  J. PAVELKA  1,884,825
TOASTER
Filed Oct. 19, 1928  3 Sheets-Sheet 1
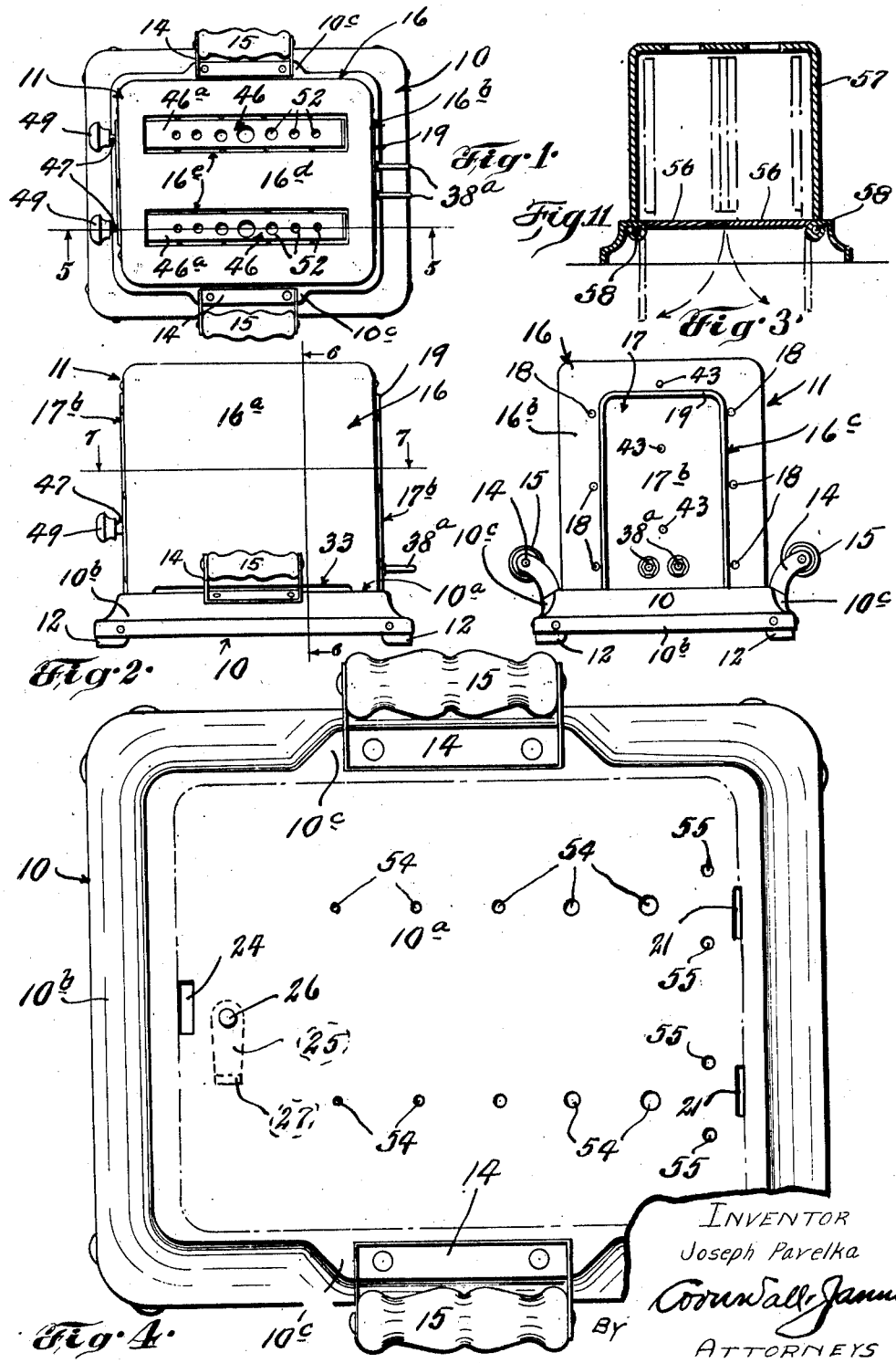
INVENTOR
Joseph Pavelka
ATTORNEYS

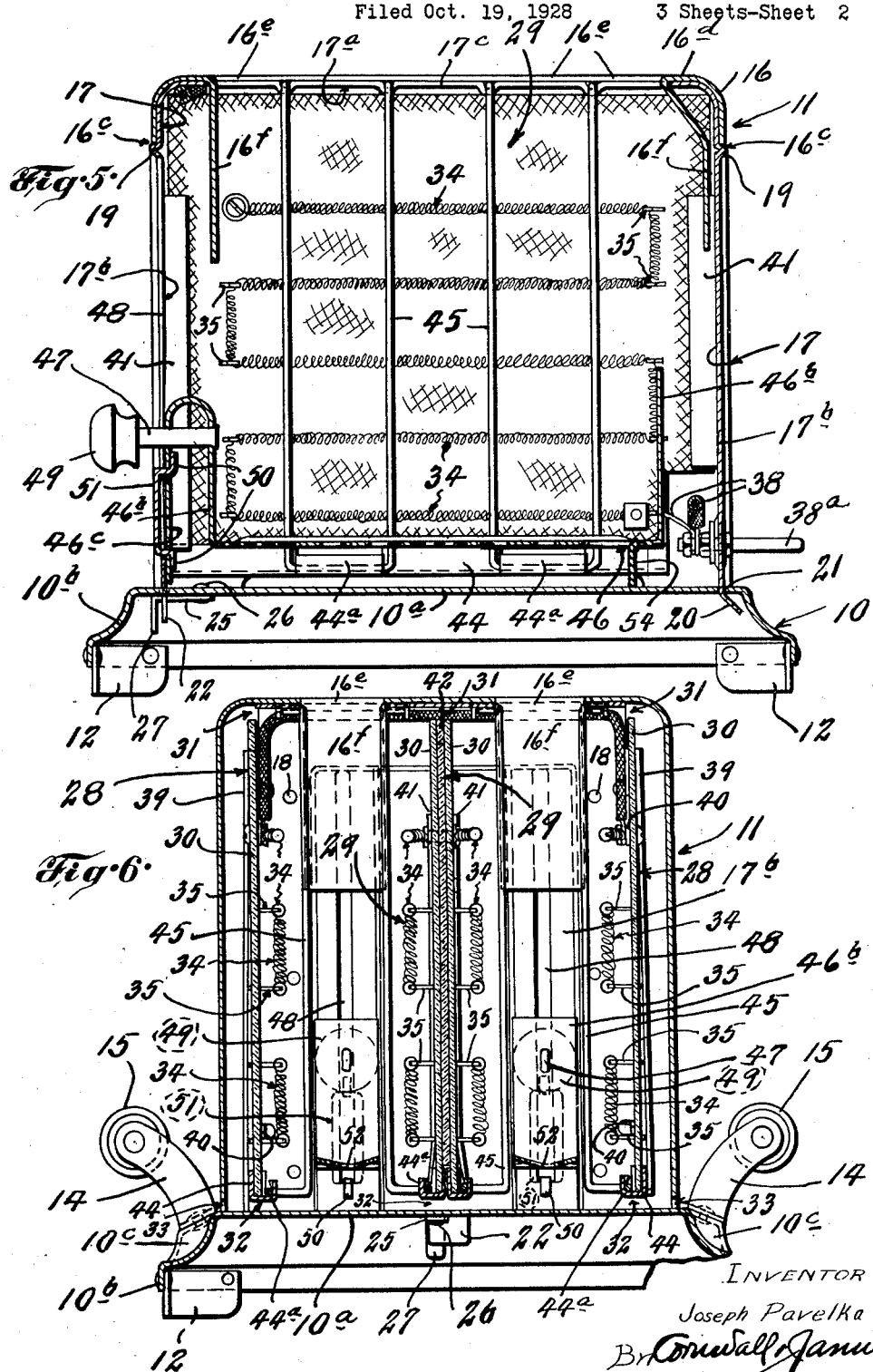

Oct. 25, 1932.  J. PAVELKA  1,884,825
TOASTER
Filed Oct. 19, 1928   3 Sheets-Sheet 3
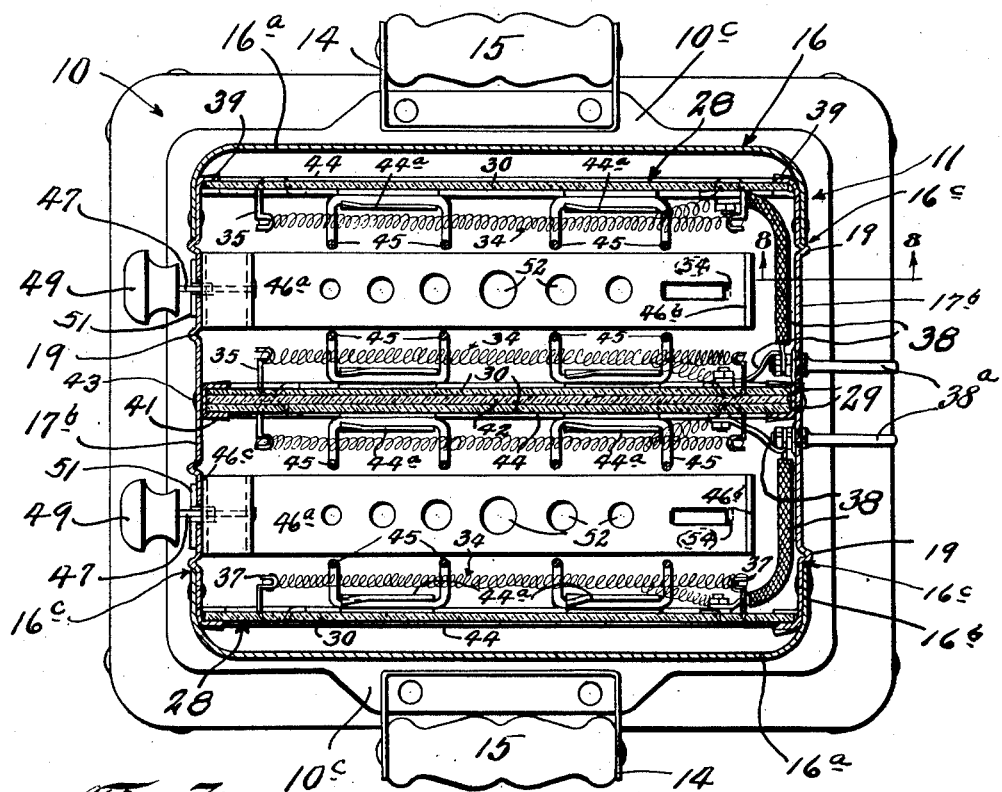
Fig. 7.
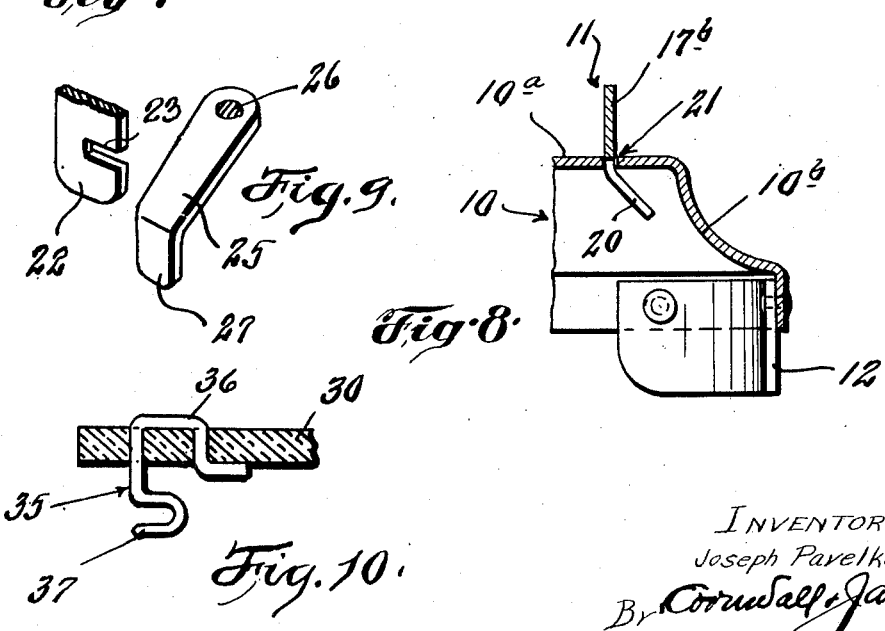
Fig. 9.   Fig. 8.
Fig. 10.
INVENTOR
Joseph Pavelka
By Cornwall & Janus
ATTORNEYS Patented Oct. 25, 1932

1,884,825

UNITED STATES PATENT OFFICE

JOSEPH PAVELKA, OF ST. LOUIS, MISSOURI

TOASTER

Application filed October 19, 1928. Serial No. 313,604.

This invention relates to new and useful improvements in electric toasters.

The primary objects of the invention are the provision of an electric toaster, the toasting compartment of which is provided with a displaceable bottom, so that the latter can be cleaned with ease and facility, and in which the heat is properly distributed to insure efficient operation of the toaster, and which can be economically manufactured.

Other objects of the invention are to provide an electric toaster consisting of two separable sections, one of which contains the heating elements and the bread carriers suitably enclosed by a casing having preferably an open bottom, while the other section comprises the base to which the first section is detachably secured to form a unitary structure.
Further objects of the invention are to so mount the heating elements upon the insulation panels that said elements are suitably spaced therefrom throughout their entire lengths, thereby eliminating loss of heat through said panels.

Still further objects of the invention are to dispose the insulating panels carrying the heating elements in an inner shell member which is formed separate from the outer shell member of said casing, thereby facilitating the production and assembly of the toasters.

Still further objects of the invention are to improve the arrangement and construction of the bread carriers so that the bread is held in proper positions and said carriers can be readily manually operated to move the bread from the toaster.

Additional objects of the invention are to provide simple means for detachably attaching the casing section to the base section so that said sections can be readily separated for cleaning or repair purposes.

With these and other objects in view, my invention consists in certain novel features of construction and arrangement of parts, hereinafter more fully described and claimed, and illustrated in the accompanying drawings, in which—

Figure 1 is a top plan view of my improved electric toaster.

Figure 2 is a side elevational view thereof.
Figure 3 is an end elevational view of same.
Figure 4 is an enlarged top plan view of the base section showing the casing section in dotted lines.

Figure 5 is an enlarged vertical cross section taken on line 5—5 of Figure 1.

Figure 6 is a vertical transverse section taken on line 6—6 of Figure 2.

Figure 7 is a horizontal cross section taken on line 7—7 of Figure 2.

Figure 8 is an enlarged cross section taken on line 8—8 of Figure 7.

Figure 9 is a perspective detail view of the latch for locking the casing section in position on the base section.

Figure 10 is an enlarged cross section of one of the hooks utilized for mounting the heating elements.

Figure 11 is a vertical cross section through a modified form of my toaster.

The toaster disclosed herein is of the type known as an oven toaster, that is, a toaster in which the heating elements and the bread to be toasted are enclosed on all sides by a suitable casing or outer shell, openings being formed in one of the walls of the casing for the admission of slices of bread into the toaster. As shown in the drawings, these openings are formed in the top of the casing in the instant case.

Referring by numerals to the accompanying drawings, 10 indicates a base section on which is detachably mounted a casing section 11 containing the operating parts of the toaster. The base 10 is preferably of rectangular shape having a flat top $10^a$ and a marginal depending flange $10^b$. A series of feet or pads 12 are secured to the underside of the base, preferably to the flange $10^b$ for supporting said base in spaced relation with the supporting surface, such as a table. These feet are preferably of heat non-conducting material, such as fiber, in order to prevent injury to the table on which it is supported. The base 10 is provided on two opposite sides with extensions $10^c$ to each of which is secured a bracket 14 which forms a mount for a handle 15. Said brackets are so formed as to space said handles suitable distances outwardly from casing section 11 as best shown in Figure 3.

Casing 11, which in the instant case is of box-shape, consists of an outer shell 16 and an inner shell 17 secured together by rivets 18 or in any other suitable manner. The outer shell 16 has solid side walls 16ᵃ, while the end walls 16ᵇ are provided with rectangular openings 16ᶜ open at the bottom. The top wall 16ᵈ of shell 16 is provided with a pair of elongated openings 16ᵉ spaced from and disposed in parallelism with each other.

The inside shell 17 is of inverted U-shape having a top wall 17ᵃ and end walls 17ᵇ. Top wall 17ᵃ is provided with openings 17ᶜ which coincide with the openings 16ᵉ. The end walls 17ᵇ fit close against the end walls 16ᵇ and are provided with outwardly presented beads 19 which are disposed adjacent to the edges of openings 16ᶜ, thereby rendering said edges inconspicuous. The lower end of one of the end walls 17ᵇ is provided with a pair of spaced depending extensions 20 which are preferably inclined downwardly and outwardly. These extensions are adapted to enter a pair of aligned elongated openings 21 formed in the flat top 10ᵃ near the end thereof as shown in Figures 2 and 8. The lower end of the opposite end wall 17ᵇ is provided with a centrally disposed depending portion 22 having formed in one of its sides a horizontally disposed notch 23. This hook or extension 22 is adapted to enter a slot or pin 24 formed in the top 10ᵃ near the opposite end thereof. A latch 25 is pivotally mounted at 26 on the underside of top 10ᵃ and is adapted to be operated to engage the notch 23, thereby locking said hook 22 against withdrawal.

A handle 27 is formed on latch 25 to facilitate the manipulation of said latch. Thus when said latch 25 is moved into position, casing 11 is securely locked to base 10. Extensions 20 are disposed obliquely in order to prevent the outward or separable movement of that end of the casing before hook 22 is released. Notch 24 is sufficiently wide to allow upward swinging motion of hook 22 about the axis formed by extensions 21.

As shown in the drawings, the present toaster is designed for receiving two slices of bread and is therefore provided with a pair of outer heating elements 28, each of which is disposed adjacent to each side of the toaster with their heating faces presented inwardly and is further provided with a pair of inside or intermediate elements 29 arranged with their heating faces in opposed spaced relation with the respective elements 28.

Each heating element consists of a pad or a sheet of insulation material 30, preferably of asbestos. Each sheet 30 is of a lesser width than the inside dimensions of inner shell 17 and the top of said sheet terminates short of the top of member 17, thereby providing an air space 31 while the bottom of each sheet terminates short of base top 10ᵃ in order to provide a suitable air space 32. In this manner, the air can circulate under and above the heating elements 28 and 29. The lower edges of the side wall 16ᵃ are cut away as indicated at 33 so as to allow the entrance of air from the outside to the interior of the toaster whereby it can circulate therethrough.

Each heating element has suitably disposed thereon a wire 34 which is held in position by means of hooks 35. These latter are secured to the pad at one end as indicated at 36 and have their hook portions 37 spaced a suitable distance from the pad so as to hold the wire 34 spaced away from the pad. Thus the heating wire is in contact with the hook portions only and is not in contact with the pad, thereby reducing the loss of heat by dissipation through said pads.

The heating elements can be electrically connected in any suitable manner. In the present instance, the outer heating elements 28 are connected in series with each other as are also the intermediate heating elements 29. The terminals of said elements are connected by connections 38 to terminal pins 38ᵃ which latter are mounted in one of the end walls 17ᵇ of shell 17 in spaced insulation therewith and project outwardly therefrom for receiving the terminal plug of a suitable electrical cord by which the toaster is connected to the supply lines in the usual manner.

Each pad 30 is removably held in position in the inner shell 17; in the case of the outer pads by means of flanges 39 and ears 40 and in the case of inner pads by means of vertically disposed channel members 41. In the case of inner pads, an additional sheet of material, such as 42, is loosely placed between said inner pads to increase the heat insulation therebetween. Flanges 39 are formed by bending at right angles the edges of end walls 17ᵇ, while ears 40 are pressed out from the latter at suitable intervals in spaced relation with said flanges so that the vertical edges of the pads of the outer elements 28 can be easily slipped therebetween and hold the pads thereof in position. Channel members 41 are formed separately from member 17 and are secured in position thereon by rivets 43. Pads 30 fit snugly in position in member 17 and no other fastening means are required. At the same time said pads can be readily detached from position when necessary.

The lower edge of each pad 30 is bound by a channel member 44 which reinforces the pad at its lower edge and protects it against injury. Also each member 44 provides suitable means for anchoring the lower ends of guides 45. These guides are preferably U-shaped and extend vertically through the toaster in spaced relation with the heating elements 28 and 29. The upper ends of said guides are seated in the top wall 17ª of member 17, while the lower or horizontally disposed portions of the guides are bent horizontally and laterally and secured to the respective channel members 44 as indicated at 44ª. Guides 45 are spaced from each other suitable distances to allow a slice of bread to be positioned therebetween and hold the latter in spaced relation with the wires 34 of the respective heating elements.

The slices of bread are inserted into the toaster through aligned openings, 16ᵉ of the outer shell 16, and 17ᶜ of the inner shell 17, and rest on bread carriers 46. Each of these carriers is mounted between the opposed pairs of heating elements and the corresponding guides 45 and is movable in a vertical plane so as to bring the toasted slices upwardly and expose them through said openings. Said carriers are preferably formed of strips of sheet metal of suitable widths, each strip being formed U-shape to provide a horizontally disposed portion 46ª extending longitudinally of the toaster and upwardly presented ends 46ᵇ which are disposed adjacent to and spaced from the downwardly deflected extensions 16ᶠ formed when openings 16ᵉ are cut in the top wall 16ᵇ. One of the ends 46ᵇ of each carrier 46 is disposed inwardly of the corresponding extension 16ᶠ and is rebent downwardly as indicated at 46ᶜ to provide a mount for a horizontally disposed handle bar 47. This handle bar is secured at its inner end to the downwardly presented portion 46ᶜ and projects outwardly from the toaster through a slot 48 vertically disposed in the corresponding end wall 17ᵇ. A handle 49 of wood or other heat non-absorbing material is secured to the projecting end of the handle bar 47 and provides convenient means for operating the carrier. The rebent portion 46ᶜ extends a suitable distance below said handle bar and receives extensions 50 of a guide 51, which latter is located exteriorly of the slot 48 in sliding engagement with wall 17ᵇ and serves to hold the carrier in proper position so as to prevent a binding action between said carrier and the respective end wall 17ᵇ. The horizontal portion 46ª of each member 46 is preferably provided with a series of openings 52 through which the air is allowed to circulate. Each portion 46ª is provided at the point remote from rebent portion 46ª with a downwardly presented leg or extension 54 which when the carrier occupies depressed position rests on top 10ª of base 10 and relieves the strain from said rebent portion 46ᶜ.

It will be observed that all of the operating parts of the toaster, including the means for attaching casing 11 to base 10, are associated with the inner shell or member 17, the outer shell or member 16 being used merely to enclose said inner member and the parts mounted therein. Thus only member 17 has to be handled during the assemblage of the different parts and casing 16 is placed in position after the completion of such operation. This not only facilitates the production, as member 17 has open sides and therefore provides easy access thereto, but casing 16 is protected against damage during the assembling operation.

The detachable feature of the toaster also provides for efficient cleaning of the toaster as by detaching member 11 top 10ª of base 10 is exposed and can be readily cleaned. This function is very desirable in toasters of the oven type as bread crumbs quickly accumulate in the base of the toaster during toasting operation and will burn and stick to the base. Thus by providing easy access to the base, one of the chief objections to toasters of this type is thereby removed.

The particular construction of hooks 35 spaces wires 34 from pads 30, thereby minimizing the contact between said wires and the supports therefor and practically eliminating loss of heat by conduction through said pads. The said hooks are of simple construction and can be readily and securely attached in position on the pads.

The arrangement of rebent portion 46ᶜ and guide 51 in cooperative relation with the slotted end 17ᵇ assures sufficient surface bearing between the respective parts and prevents sagging and binding of the bread carrier 46.

It will be observed that the openings 52 in horizontal portions 46ª of each bread carrier 46 are of varying sizes, the sizes of the openings diminishing toward each end (see Fig. 7) and that said portion 46ᶜ is curved transversely with the concave face presented upwardly (see Fig. 6). The curved face spaces said openings from the bread whereby air can circulate through said openings and around said bread. The sizes of the openings vary in order to insure even distribution of air throughout the entire surfaces of the slice. To this end the centrally located openings are larger to allow greater amount of air to pass therethrough. The outer edges of the slice being located in less heated zones do not require as much ventilation as the central portions of the slice.

The flat face 10ª which forms the bottom of the toasting compartment is preferably provided with a series of apertures 54 which admit air through base 10 into said toasting compartment. It will be remembered that feet 12 space the base from the supporting surfaces so that air can freely pass under said base and then upward through apertures 54 into the toaster. Thus, feet 12 in the instant case serve two-fold purpose; first, to form a suitable insulation support for the base, and, second, to space the base from the surface on which it rests to allow air to circulate through said base and the toaster. The apertures 54 are arranged in two rows, each row being disposed below and parallel with horizontal portion 46ᶜ of the corresponding bread basket.

The apertures of each row are gradually reduced in size, the largest being near the closed end of the toaster and the smallest being adjacent to the slotted end wall of the same. In addition, there are two apertures 55 arranged adjacent to the closed end wall and spaced equidistant to each side of each row of apertures 54. This is for the purpose of effecting proper distribution of heat throughout the toaster, so that the slices of bread are uniformly and properly toasted. As one of the end walls of the toaster is vertically slotted, it is obvious that this end of the toaster would not function properly due to improper air circulation. By providing apertures 54 and 55, proper circulation of air through the toaster is assured and the heat is equalized so as to provide efficient and even toasting of the bread.

In Figure 11 is shown a modified form of my invention, wherein the bottom 56 of the toaster 57 is hinged as indicated at 58, whereby by opening said bottom it may be readily cleaned of crumbs without the necessity of detaching it from the toaster. By using this construction the base of the toaster need not be formed detachable, but can be permanently secured in position. The bottom may be either locked in closed position or it may be spring-held in such position.

The pads 30 are spaced from casing 16 and sufficient air spaces are provided therebetween to allow air to circulate therethrough so as to prevent excessive heating of said casing. Air spaces 33 permit the admission of air into the casing and air spaces 32 allow the circulation of the air therethrough; the heated air being discharged through the openings 16ᵃ. In this manner proper ventilation is provided within the toaster so that the bread is uniformly toasted and the vapors are discharged from the toaster, thereby producing crisp surface for the toast.

A toaster of my improved construction is efficient for performing its intended purpose, is so constructed as to provide easy access to the base thereof for cleaning purposes, and is assured of proper ventilation to insure proper toasting operation, and can be economically manufactured.

While I have shown and described a preferred form of my invention, it is to be understood that various changes in the construction and arrangement of parts of my improved toaster can be made and substituted for those herein disclosed without departing from the spirit of my invention.

I claim:

1. An electric toaster comprising a base, an inverted U-shaped support detachably arranged on said base and provided in the top with elongated spaced openings, heating elements, means on the parallel portions of said support for detachably receiving said heating elements in spaced relation with each other and with said elongated openings, bread carriers movably mounted within said support between said heating elements, and a casing secured to said support and enclosing the same and parts associated therewith, said casing being provided with elongated openings aligned with the openings of said support.

2. An electric toaster comprising a base, an inverted U-shaped support arranged on said base and provided in the top with elongated spaced openings, heating elements, sheets of insulation material having their vertical edges mounted in the parallel portions of said support, said heating elements being arranged on said sheets in spaced opposed relation with each other, said sheets having their horizontal edges spaced from said base and from the top of said support to provide air spaces therebetween, and a casing for enclosing said support and parts associated therewith, said casing being provided in its side walls with air openings for admitting air thereinto, the top of said casing being provided with openings aligned with the openings of said support through which the bread is admitted between said heating elements.

3. In a toaster, the combination of an inverted U-shaped support, a casing enclosing said support and having an open bottom, a plurality of heating elements mounted within said casing and said support in spaced relation with each other to form a plurality of vertically disposed toasting compartments, said casing being provided in its top wall with a plurality of elongated openings registering with said toasting compartments forming ingress thereto, a base detachably secured to said U-shaped support and forming a bottom for said compartment, and bread carriers slidably mounted in said support for movement in vertical planes in said compartments.

4. In a toaster, the combination of a casing having imperforate side and end walls and an open bottom, a plurality of insulation pads detachably arranged within said casing to form a plurality of toasting compartments, the top wall of said casing being provided with a plurality of elongated openings forming ingress to said compartments, heating elements mounted on the opposed sides of said insulation pads of each toasting compartment, a plurality of vertically disposed wires arranged in each compartment to space the bread from said heating elements, a slice carrier slidably mounted in said casing and disposed in each toasting compartment for movement in vertical plane between said guide wires, and a base detachably secured to the bottom of said casing to form bottoms for said toasting compartments.

5. In an electric toaster, an inverted U-shaped support having an elongated opening formed in one of its walls, a casing enclosing said support and having an elongated opening coinciding with the opening of said support, a pair of opposed heating elements arranged in spaced relation within said support to each side of said openings, means in said support for detachably mounting said heating elements, a bread carrier disposed intermediate said heating elements and slidably mounted in one of the walls of said support for movement in a plane parallel with said heating elements and in alignment with said coinciding openings, and guide rods stationarily mounted within said support to each side of said bread carrier for supporting the bread in spaced relation with said heating elements.

6. In an electric toaster, an inverted U-shaped support having an elongated opening formed in one of its walls, a casing enclosing said support and having an elongated opening coinciding with the opening of said support, a pair of opposed heating elements arranged in spaced relation within said support to each side of said openings, means in said support for detachably mounting said heating elements, a bread carrier disposed intermediate said heating elements and slidably mounted in one of the walls of said support for movement in a plane parallel with said heating elements and in alignment with said coinciding openings, guide rods stationarily mounted within said support to each side of said bread carrier for supporting the bread in spaced relation with said heating elements, and a base for detachably receiving and supporting said casing and said support.

7. In a toaster, the combination of a casing forming a toasting compartment and having an open bottom and an opening in the top wall forming ingress to said toasting compartment, and a base for said casing, said base forming a bottom for said toasting compartment and having a series of perforations formed therein, the areas of said perforations being graduated to insure proper distribution of heat throughout said toasting compartment.

In testimony whereof I hereunto affix my signature this 10th day of October, 1928.

JOSEPH PAVELKA.